United States Patent [19]

Schleier et al.

[11] Patent Number: 4,720,535

[45] Date of Patent: Jan. 19, 1988

[54] MOISTURE TEMPERED, STORAGE STABLE SINGLE COMPONENT POLYURETHANE SYSTEMS AND THEIR APPLICATION

[75] Inventors: Gisbert Schleier, Heidelberg; Friedrich Gerold, Haar, both of Fed. Rep. of Germany

[73] Assignee: BASF Aktiengesellschaft, Ludwigshafen, Fed. Rep. of Germany

[21] Appl. No.: 20,951

[22] Filed: Mar. 2, 1987

[30] Foreign Application Priority Data

Mar. 11, 1986 [DE] Fed. Rep. of Germany ....... 3607996

[51] Int. Cl.$^4$ .............................................. C08G 18/10
[52] U.S. Cl. ..................................................... 528/59
[58] Field of Search .......................................... 528/59

[56] References Cited

FOREIGN PATENT DOCUMENTS 1205249  5/1986  Canada .

Primary Examiner—Maurice J. Welsh
Attorney, Agent, or Firm—John C. Demeter

[57] ABSTRACT

This invention relates to moisture tempered, storage stable, single component polyurethane systems prepared from a polyurethane prepolymer derived from an aromatic polyisocyanate, and a polyaldimine, which are used for preparing polyurethane elastomers or polyurethane coatings having improved temperature resistance.

7 Claims, 2 Drawing Figures

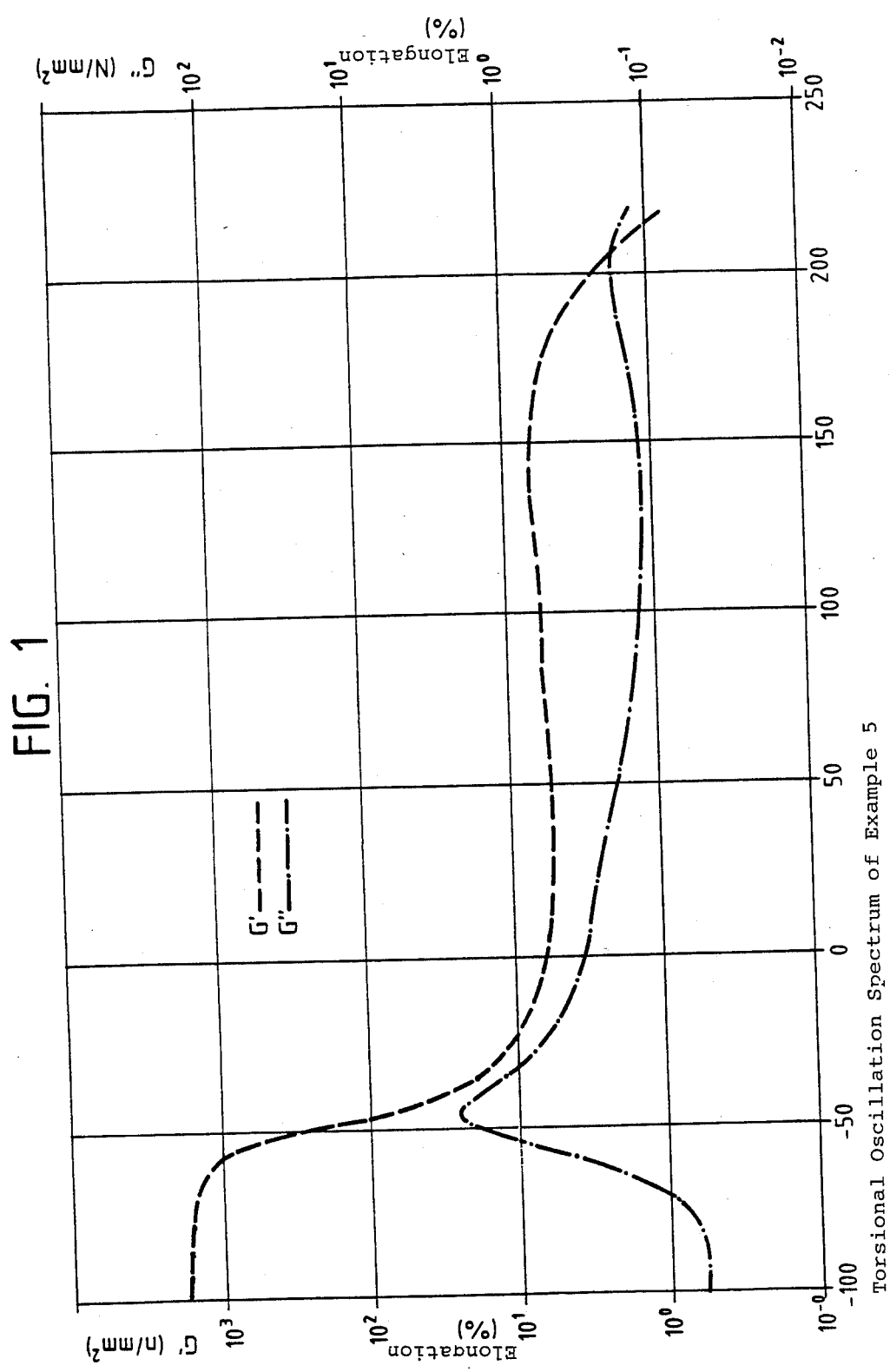

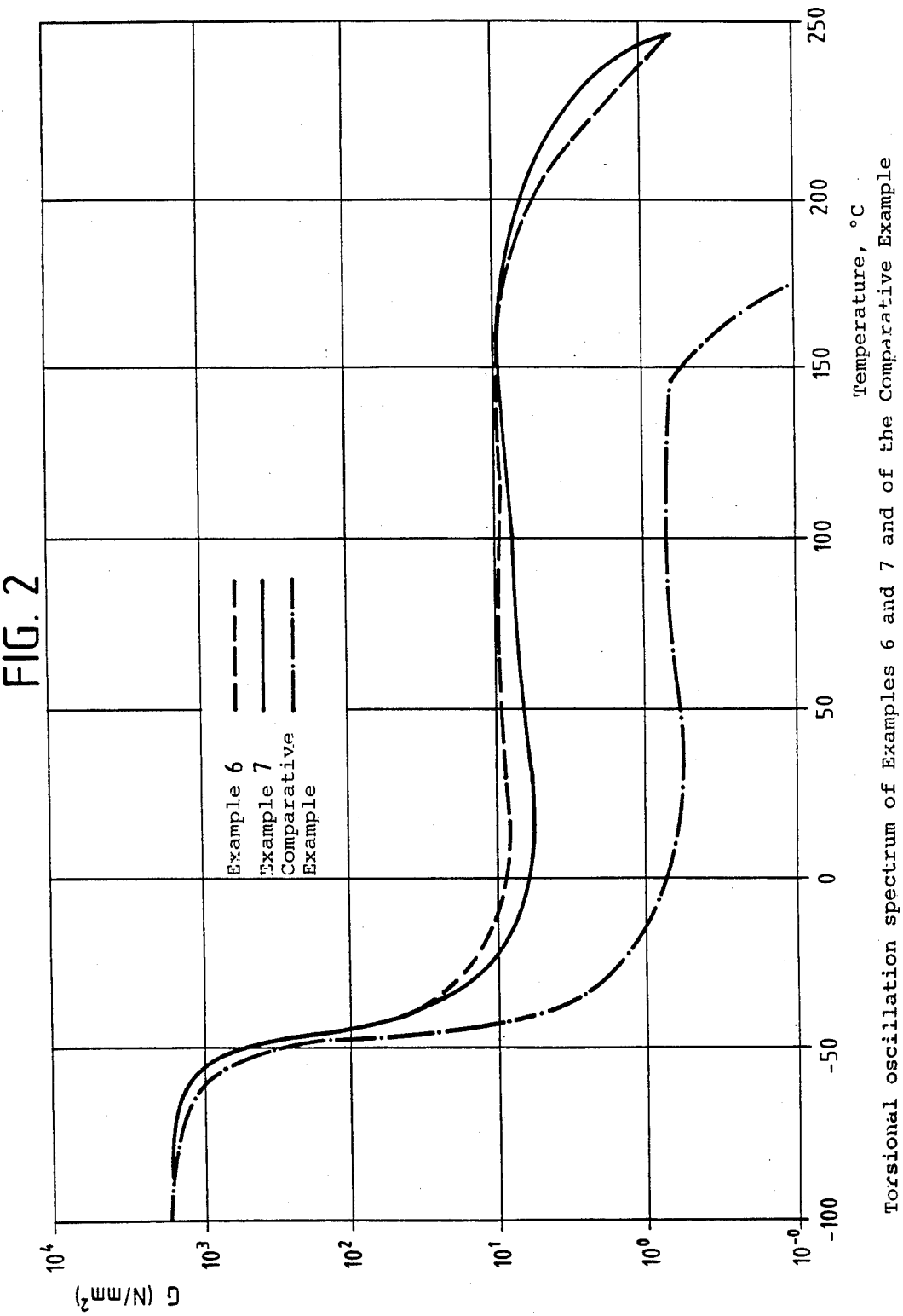

MOISTURE TEMPERED, STORAGE STABLE SINGLE COMPONENT POLYURETHANE SYSTEMS AND THEIR APPLICATION

BACKGROUND OF THE INVENTION

1. Field of the Invention

The present invention relates to moisture tempered (i.e. activated) single component polyurethane systems prepared from aromatic polyisocyanate prepolymers which are storage stable. The polyurethane elastomers prepared with said system show improved temperature resistance.

2. Description of the Art

Single component polyurethane systems are mixtures of special polyurethanes and/or polyureas forming initial compounds which in the absence of water or moisture are more or less storage stable. In the presence of water, these mixtures demonstrate a quick gel-hardening and are cold setting.

According to EP-A-No. 81729 such polyurethane-polyurea systems are used for formulating hydrolysis stable, low temperature resistant polyether urethanes, and abrasion resistant, wear protective coatings, whereby mixtures of a graft polyether polyol, an aromatic diamine and tertiary amine catalyst and organic polyisocyanate are poured or sprayed onto the surfaces, which are to be protected, using a suitable multi-component proportioning- and mixing unit. A disadvantage to this process is that often under difficult conditions on construction sites one must work with complicated and expensive mixing units, and in turn processing safety can be inadequate. This problem can be overcome through the moisture tempered, storage stable single component polyurethane systems which are described in Federal Republic of Germany Application No. 33 06 373. The systems described therein are based on isocyanate prepolymers consisting of aliphatic diisocyanates which provide polyurethanes whose mechanical properties and temperature stability could not satisfy all of the requirements for some areas of application.

SUMMARY OF THE INVENTION

The object of this discovery was to develop moisture tempered, storage stable single component polyurethane systems, which could be simply processed to form polyurethane-elastomers or coatings with improved temperature resistance.

Surprisingly it was discovered that primary reactive aromatic polyisocyanates could be used, rather than aliphatic and/or cycloaliphatic polyisocyanates, for preparing polyurethane-prepolymers which, when combined with other components, affords a moisture tempered, storage stable, single component polyurethane system. The polyurethane-elastomers prepared from said system demonstrate improved temperature resistance.

The subject of the invention is moisture tempered, storage stable, single component polyurethane systems, which comprises:

(A) a polyurethane-prepolymer having an NCO content from 1 to 10 weight percent, preferably from 2.5 to 6 weight percent, based on the entire weight of the prepolymers, produced through reaction of a higher molecular weight polyol and an aromatic polyisocyanate.

(B) a polyaldimine having the formula $$R(N=CH-C(CH_3)_2-CH_2-R^1)_n,$$

wherein:

R is a, preferably difunctional, arylene radical having the structure

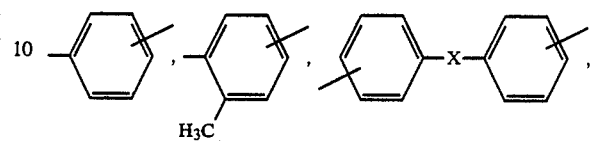

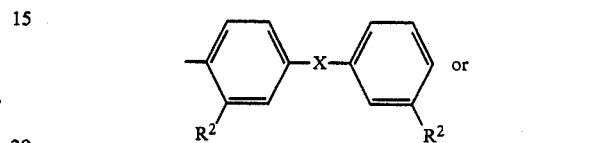

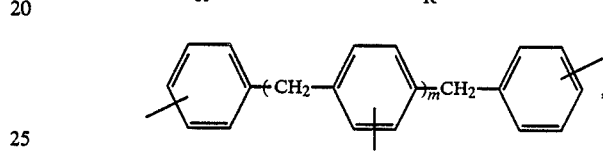

wherein

X is a $-CH_2-$, $-C(CH_3)_2-$, $-O-$, $-SO-$, $-SO_2-$ or $-CO-$ bridge member;

$R^2$ is a linear or branched alkyl radical having from 1 to 4 carbon atoms, preferably from 1 to 2 carbon atoms;

m is a whole number from 1 to 4, preferably from 1 to 2;

$R^1$ is a hydrogen atom, an alkyl group having from 1 to 10 carbon atoms, preferably from 1 to 3 carbon atoms, an alkoxy group having from 1 to 20 carbon atoms, preferably from 1 to 8 carbon atoms, or an alkoyloxy group having from 1 to 20 carbon atoms, preferably from 2 to 8 carbon atoms; and n is a whole number from 2 to 6, preferably 2; and optionally including (C) an aromatic and/or aliphatic carboxylic acid or toluene sulfonic acid; and further optionally including (D) auxiliaries and/or additives.

BRIEF DESCRIPTION OF THE DRAWINGS

FIG. 1 is a graph showing torsional elongation of Example 5.

FIG. 2 is a graph showing torsional elongation of Examples 6 and 7 and the comparative Example.

DESCRIPTION OF THE PREFERRED EMBODIMENTS

The single component polyurethane systems of the present invention allow solvent-free production of corrosion inhibiting polyurethane coatings through spray application with the help of single component proportioning mixing units onto large metal surfaces, as well as the coating of plastics, stone, plaster or cement with elastic polyurethanes. In addition, molded articles can be prepared, for example by pouring the single component polyurethane system into a mold, and allowing it to cure in the presence of moisture, or by mixing the single component polyurethane system with water and then placing the mixture into the mold.

The following initial components are suited for the production of the said storage stable, moisture tempered, single component polyurethane systems:

(A) A polyurethane-prepolymer, having an NCO content from 1 to 10 weight percent, preferably from 2.5 to 6 weight percent, is the reaction product of excess quantities of aromatic polyisocyanate with a higher molecular weight polyol. These prepolymers can optionally contain secondary quantities of monomeric aromatic polyisocyanates, preferably from 0 to 5 weight percent.

Examples of aromatic polyisocyanates which can be used are: 1,5-diisocyanato-naphthalene, diisocyanato-benzene, 2,4- and 2,6-diisocyanato-toluene and the corresponding isomeric mixtures, 4,4'-, 2,4'- and 2,2'-diphenylmethane diisocyanate and the corresponding isomeric mixtures, polyphenyl-polymethylene polyisocyanates, mixtures of diphenylmethane diisocyanates and polyphenyl-polymethylene polyisocyanates and/or diisocyanato toluene isomers. The said di- and polyisocyanates can be used individually or as mixtures. Preferably used is 4,4'-diphenylmethane diisocyanate or a mixture consisting of at least 50 weight percent of 4,4'-diphenylmethane diisocyanate, from 0 to 50 weight percent, preferably from 0 to 10 weight percent, of 2,4'-diphenylmethane diisocyanate and/or from 0 to 30 weight percent, preferably from 0 to 10 weight percent, of polyphenyl-polymethylene polyisocyanate, wherein the total of said components results in 100 weight percent and the weight percent is based on the entire weight of the mixture.

The reaction partner for the aromatic polyisocyanate and for preparing the polyurethane-prepolymers is a polyol. Suitable polyols are those having a functionality from 2 to 3, preferably 2, and having a molecular weight from 1000 to 8000, preferably from 1800 to 6000. Examples of such polyols include polyether polyols, polyester polyols, polythiol-ether polyols, polyester amides, polyacetals containing hydroxyl groups, and aliphatic polycarbonates containing hydroxyl groups or mixtures of at least two of said polyols. Preferably used are polyester polyols and/or polyether polyols.

Suitable polyester polyols can be prepared, for example, from organic dicarboxylic acids having from 2 to 12 carbon atoms, preferably aliphatic dicarboxylic acids having from 4 to 6 carbon atoms, and multivalent alcohols, preferably diols, having from 2 to 12 carbon atoms, more preferably from 2 to 6 carbon atoms. Examples of dicarboxylic acids are: succinic acid, glutaric acid, adipic acid, suberic acid, azelaic acid, sebacic acid, decandicarboxylic acid, maleic acid and fumaric acid. The dicarboxylic acids can be used both individually and as mixtures. In place of the free dicarboxylic acid, the corresponding dicarboxylic acid derivative can be used, such as dicarboxylic acid esters of alcohols having from 1 to 4 carbon atoms or dicarboxylic acid anhydrides. Preferably used are dicarboxylic acid mixtures consisting of succinic, glutaric and adipic acids in quantity ratios of 20-35: 35-50: 20-32 parts by weight, and especially adipic acid. Examples of multivalent alcohols, preferably diols, are: ethanediol, diethylene glycol, 1,2- and/or 1,3-propanediol, dipropylene glycol, 1,4-butanediol, 1,5-pentanediol, 1,6-hexanediol, 1,10-decanediol, glycerine and trimethylolpropane. Preferably used are ethanediol, diethylene glycol, 1,4-butanediol, 1,5-pentanediol, 1,6-hexanediol or mixtures of at least two of the said diols, especially mixtures consisting of 1,4-butanediol, 1,5-pentanediol and 1,6-hexanediol. Also useful are polyester polyols from lactones, for example, ε-caprolactone; or hydroxycarboxylic acids, for example ω-hydroxycarboxylic acid.

The polyester polyols preferably have a functionality of 2 and a molecular weight from 1000 to 3000 and more preferably from 1800 to 2500.

However, polyether polyols are preferably used as the polyol which is prepared using known methods, for example through anionic polymerization with alkali hydroxides such as sodium or potassium hydroxide, or alkali alcoholates such as sodiummethylate, sodium- or potassium methylate or potassium isopropylate as catalysts, or by cationic polymerization with Lewis acids such as antimony pentachloride, boron fluoride etherate, etc. or bleaching earth as catalysts from 1 or more alkylene oxides having from 2 to 4 carbon atoms in an alkylene radical and optionally an initiator molecule which contains in bonded form from 2 to 3, preferably 2, reactive hydrogen atoms.

Suitable alkylene oxides include tetrahydrofuran, 1,3-propylene oxide, 1,2- and/or 2,3-butylene oxide, styrene oxide, epichlorohydrin, and preferably ethylene oxide and 1,2-propylene oxide. The alkylene oxides can be used individually, alternating one after another, or as mixtures. Typical initiator molecules are: water; organic dicarboxylic acids, such as succinic acid, adipic acid, phthalic acid and terephthalic acid; alkanolamines such as ethanolamine, diethanolamine, and triethanolamine; and ammonia. Preferably used are di- and/or trifunctional alcohols such as ethanediol, 1,2propanediol, and 1,3-propanediol, diethylene glycol, dipropylene glycol, 1,4-butanediol, 1,6-hexanediol, glycerine and trimethylolpropane.

The polyether polyols preferably have a functionality of 2 and have molecular weights from 1000 to 8000, more preferably from 1800 to 6000, and particularly from 1800 to 4000. As with the polyester polyols, the polyether polyols can be used individually or as mixtures. In addition, they can be mixed with the polyester polyols as well as with the polyester amides containing hydroxyl groups, polyacetals and/or polycarbonates.

Examples of polyacetals containing hydroxyl groups are those compounds which can be prepared from glycols such as diethylene glycol, triethylene glycol, 4,4'-dihydroxyethoxydiphenyldimethyl methane, hexanediol and formaldehyde. Suitable polyacetals can also be prepared through polymerization of cyclic acetals.

Hydroxyl group-containing polycarbonates which may be used are those of the essentially known types prepared for example through the reaction of diols, such as 1,3-propanediol, 1,4-butanediol and/or 1,6-hexanediol, diethylene glycol, triethylene glycol or tetraethylene glycol with diaryl carbonates, for example diphenyl carbonates or phosgene.

Among the polyester amides are those obtained from multivalent saturated and/or unsaturated carboxylic acids and/or their anhydrides and multivalent saturated and/or unsaturated amino alcohols or mixtures of multivalent alcohols and amino alcohols and/or polyamines, primarily linear condensates.

When preparing the polyurethane-prepolymers, the polyol or the polyol mixture, preferably the di- and/or trifunctional polyester and/or polyether polyol, having molecular weights from 1000 to 8000, preferably in the absence of lower molecular chain extending or crosslinking agents, is reacted in a conventional fashion using excess aromatic polyisocyanate or the polyisocyanate mixture in such quantity ratios that the resulting polyurethane-prepolymer posseses the previously mentioned NCO content. Understood to be included as polyurethane prepolymers are, as already described, both prepolymers exhibiting monomer-free isocyanate groups as well as their mixtures with secondary quantities of excess monomeric aromatic polyisocyanates.

In order to avoid a viscosity increase, malonic acid diethylester can be incorporated into the polyurethane-prepolymers and/or into the said single component systems as an additive, generally in a quantity from 0 to 10 weight percent, preferably from 1 to 4 weight percent, based on the weight of the polyurethane-prepolymers (A).

(B) Typical polyaldimines are those having the structural formula

in which R, R¹ and n have the previously stated meaning. The polyaldimines can be used individually or as mixtures. In addition, the aldimines can be present in the en-amine form.

In preparing the polyaldimines, a primary aromatic polyamine, preferably a primary aromatic diamine is mixed together with an excess of optionally substituted 2,2-dimethylpropanal (pivalaldehyde) having the formula

in which R¹ has the previously stated meaning, preferably in a —NH₂/—CHO ratio from 1:1 to 5, especially from 1:2 to 4, and then followed by the addition of a suitable solvent such as for example toluene, xylene, benzene, methylene chloride, dichloroethane, cyclohexane or heptane. The mixture is heated in the presence of an inert gas under the reaction conditions with a water collector until the theoretically expected water quantity has separated. Normally, reaction times from 1 to 10 hours are required.

Purifying the polyaldimide, i.e. by distillation, is not necessarily required. After distilling off the excess optionally substituted, 2,2-dimethyl propane and the solvent, the polyaldimine product can be used directly.

Preferably used in preparing polyaldimines are primary aromatic diamines having from 6 to 15 carbon atoms. Examples of which include 1,3- and/or 1,4-phenylene diamine, 2,4- and 2,6-toluene diamine as well as the corresponding isomeric mixtures 4,4'-, 2,4'-and 2,2'-diamino-diphenylmethane, 2,2-propane-, -ether, -sulfide, -sulfone and -ketone, as well as the corresponding isomeric mixtures of the individual classes of compounds 3,3'-dimethyl-, 3,3'-diethyl-and 3,3'-diisopropyl-4,4'-diamino-diphenylmethane. Preferably used are 1,3-phenylene diamime, 4.4'-diamino-diphenylketone, 4,4'-diamino-diphenylmethane and especially 3,3'-dimethyl-4,4'-diamino-diphenylmethane.

Examples of optionally substituted 2,2-dimethyl propanols, in addition to the preferably used 2,2-dimethyl propanols, are: 3-methoxy-, 3-ethoxy, 3-isopropoxy- and 3-n-butoxy-2,2-dimethyl propanal, 3-(methyl-carbonyloxy and 3(isopropyl-carbonyloxy)2,2-dimethyl propanal and esters from fatty acids and 3-hydroxy-2,2-dimethylpropanal.

(C) The polyaldimines used in the present invention hydrolyze in the presence of moisture. The hydrolysis rate can be accelerated through the addition of organic carboxylic acids, for example aliphatic and preferably aromatic carboxylic acids or toluene sulphonic acid. Examples include aliphatic carboxylic acids, such as formic acid, acetic acid, mono-, di- and trichloroacetic acid, oxalic acid, malonic acid, maleic acid, and fumaric acid; and aromatic carboxylic acids such as benzoic acid, mono-, di- and trichlorobenzoic acid, salicylic acid and alkyl-monophthalate. Preferably used are benzoic acid and 2chlorobenzoic acid.

(D) The moisture tempered, storage stable, single component polyurethene systems can contain auxiliary agents and/or additives, such as fillers, plasticizers, pigments, carbon black, micro filters, thixotropic agents and antioxidants, for example phenothiazines, stearically hindered phenols or diphenyl amine derivatives, without significantly impairing the advantageous properties.

In the preparation of the said single component polyurethane system, the polyurethane-prepolymer (A) and the polyaldimine (B) are mixed together in such quantities at temperatures from 0° to 100° C., preferably from 20° to 50° C., while stirring so that from 0.4 to 1.3 equivalents, preferably from 0.5 to 0.9 equivalents, of —N=CH-groups of polyaldimines are present per NCO-group of prepolymer (A). It is advantageous if a slight excess of —NCO groups are present in the single component polyurethane system.

Subsequently added to the resulting mixture at room temperature is from 0 to 100 equivalents, preferably from 1 to 5 equivalents, of an aromatic and/or aliphatic carboxylic acid or toluene sulphonic acid per equivalent —N=CH group of the polyaldimines (B).

The said moisture tempered, single component polyurethane systems are storage stable for more than 6 months if protected from moisture. In the presence of moisture rapid gel formation results and hardening. The products are suited for the following types of compounds: sealing, casting, patching, cementing and coating. However, they are preferably used for the preparation of polyurethane elastomers, such as molded articles and coatings, having improved temperature resistance.

EXAMPLE 1

Preparation of Polyaldimines

One mole of an aromatic diamine and 6 moles of 2,2-dimethylpropanal, which contains 8 weight percent of t-butanol as a side product, or 6 moles of 3-n-butoxy-2,2-dimethylpropanal, were mixed at room temperature and condensed in the presence of nitrogen in a water collecting device until the theoretically expected amount of water had separated. Following this, the excess 2,2-dimethyl propanol and/or 3-n-butoxy-2,2-dimethylpropanal was distilled off.

For determining the aldimine content, the residue obtained was dissolved in acetic acid then titrated with 0.1 N perchloric acid in dioxane. In addition, the samples were characterized using H—NMR— and IR-spectra.

The initial materials used and the resulting dialdimines are summarized in Table I.

TABLE I

| Example | Diamine | Aldehyde | Dialdimine | —N= Calculated | Equivalent/g determined | Melting Point °C. |
|---------|---------|----------|------------|----------------|-------------------------|-------------------|
| 1a | 1,3-phenylene-diamine | 3-n-butoxy-2,2-dimethyl-propanal | 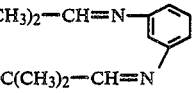 | 5.2 | 5.0 | <20 |
| 1b | 4,4'-diamino-diphenylketone | 2,2-dimethyl-propanal | 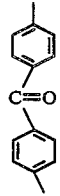 | 5.3 | 5.4 | 130–140 |
| 1c | 4,4'-diamino-diphenylmethane | 2,2-dimethyl-propanal | 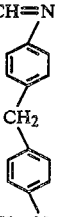 | 6.0 | 5.9 | 68–72 |
| 1d | 3,3-dimethyl-4,4'-diamino-diphenylmethane | 2,2-dimethyl-propanal | 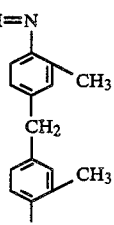 | 5.5 | 5.3 | <20 |

EXAMPLE 2

Preparation of a polyurethane-prepolymer

Within 2 hours a mixture comprising the following was added to 16 parts by weight of 4,4'-diphenylmethane diisocyanate at 80° while stirring in a nitrogen atomosphere:

13.5 parts by weight of a trifunctional polyether polyol having a molecular weight of 6500, prepared through addition polymerization of 1,2-propylene oxide on trimethylol propane and subsequent addition of ethylene oxide on the resulting trimethylol propane-propylene oxide adduct;

33.1 parts by weight of a trifunctional polyether polyol having a molecular weight of 2000, prepared through addition polymerization of 1,2-propylene oxide on glycerine;

33.1 parts by weight of a trifunctional polyether polyol having a molecular weight of 3900, prepared through addition polymerization of 1,2-propylene oxide on glycerine and subsequent addition of ethylene oxide on the resulting glycerine-propylene oxide adduct;

0.035 parts by weight of benzonyl chloride; and 2.0 parts by weight of malonic acid diethylester.

The reaction mixture was stirred at 80° C. until the NCO content was from 3.1 to 3.2 weight percent.

Following cooling to room temperature, a suspension comprising of 1.0 parts by weight of malonic acid diethylester and 0.5 parts by weight of phenothiazine and/or 1.0 parts by weight of a mixture comprising of dioxtyldiphenyl amine and ditert.-butylcresol (weight ratio 1:1) was incorporated into the polyurethane-prepolymer.

Following this, the polyurethane-prepolymer possessed a viscosity from 10,000 to 15,000 m.Pa.s at 25° C. and had an NCO content from 2.8 to 3.0 weight percent.

EXAMPLES 3–8

Preparation of a single component polyurethane system 100 parts by weight of the polyurethane-prepolymer prepared according to Example 2 was mixed together with such a quantity of dialdimine according to Example 1 while stirring at room temperature, so that the ratio of —NCO/—N=groups was 1.2. Following this an acid was added to the mixture for the catalysis of the aldimine hydrolysis, and the atmosphere was removed under reduced pressure.

In order to test the single component polyurethane system, an open, separated mold having the dimensions 20×10 cm was filled with a 3 mm thick layer, and allowed to cure at a relative humidity of 50 percent.

The mechanical properties of the test plates were measured following 7 days of storage. In examining the temperature resistance, the molded articles were tempered 30 minutes at 190° C. FIGS. 1 and 2 illustrate the torsion oscillation spectrum of selected test molded articles.

The composition of the polyurethane systems and the mechanical properties measured on the molded test articles are summarized in Table 2.

In Table 2, the weight percents of antioxidant and acid catalyst added are based on the quantity of polyurethane prepolymer used.

The benzoic acid was used in the form of a 10 weight percent solution in dimethyl phthalate.

Preparing the Single Component Polyurethane System 100 parts by weight of the prepolymer was mixed together at room temperature while stirring with such a quantity of aldimine so that the ratio of —NCO/—N= groups was 1.2.

Following this, benzoic acid was added to the mixture as a catalyst.

Molded test articles wer prepared from the single component polyurethane system analogous to Example 2; the mechanical properties described in Table II were measured from these.

TABLE II

Composition of the single component polyurethane systems and the mechanical properties of the molded articles prepared from them through moisture tempering.

| | | | | | | Mechanical Properties | | | |
|---|---|---|---|---|---|---|---|---|---|
| | | | | | | | | After 30 Minutes at 190° C. | |
| | Dialdimine | | Catalyst | | | Tensile | Percentage | Tensile | Percentage |
| | according to | | | Quantity | Shore A | Strength | Elongation | Strength | Elongation |
| Example | Example 3 | Antioxidant | Type | % | Hardness | at Break | at Break | at Break | at Break |
| 3 | 1a | — | benzoic acid | 2 | 24 | 1.3 | 2000 | — | — |
| 4 | 1b | phen. | TX-acid | 0.15 | 36 | 4.3 | 980 | 2.8 | 526 |
| 5 | 1c | — | phthalate | 1.0 | 68 | 10.0 | 840 | — | — |
| 6 | 1d | — | benzoic acid | 0.8 | 77 | 10.4 | 650 | 9.0 | 540 |
| 7 | 1d | phen. | benzoic acid | 0.8 | 77 | 14.0 | 800 | 13.2 | 730 |
| 8 | 1d | comb. | benzoic acid | 0.8 | 77 | 12.4 | 770 | 12.4 | 740 |
| Comparative Example | — | benzoic acid | 1.0 | | 35 | 1.3 | 324 | — | — |

The abbreviations used in Table 2 have the following meaning:

Phen.: phenothiazine

Comb.: a combination comprised of dioctyldiphenylamine and di-tert.butyl-cresol in a 1:1 weight ratio TX-acid: TX-acid is a commercial product from Witco based on xylene sulphonic acid.

Phthalate: mono-3,5-dioxaoctylphthalate.

COMPARATIVE EXAMPLE

Preparation of a dialdimine from 3-(isopropyl-carbonyloxy)-2,2-dimethyl-propanal and 1,6-hexamethylene diamine 378 parts by weight of 3-(isopropyl-carbonyloxy) 2,2-dimethyl-propanal, 116 parts by weight of hexamethylene-diamine and 70 parts by weight of heptane were mixed together at room temperature and condensed in the presence of nitrogen for 1 hour at 90° C., and heated to a maximum of 150° C. in a water collecting device. After 3 hours, 36 parts by weight of water had separated off. The reaction mixture was then allowed to cool and then the excess aldehyde and heptane were distilled off under a pressure of 10 mbar and at maximum of 150° C.

Preparing the Polyurethane Prepolymer 100 parts by weight of a polyoxypropylene glycol having a molecular weight of 2000 and 175 parts by weight of a polyether polyol having a molecular weight of 4900 based on glycerine/1,2-propylene oxide/ethylene oxide were stirred for 3 hours at 70° C. with 39 parts by weight of 3-isocyanatomethyl-3,5,5-trimethylcyclohexyl-isocyanate.

Following this, it was allowed to cool to room temperature to afford a prepolymer having an NCO content of 2 weight percent and a viscosity of 24 Pa.s. at 25° C.

The embodiments of the invention in which an exclusive property or privilege is claimed are defined as follows;

1. A moisture tempered, storage stable single component polyurethane system comprising (A) a polyurethane prepolymer having an NCO content of from 1 to 10 percent by weight, prepared by the reaction of a higher molecular weight polyol and an aromatic polyisocyanate;

(B) a polyaldimine having the formula $$R(N=CH-C(CH_3)_2-CH_2-R^1)_n,$$

wherein:

R is an arylene radical having the structure

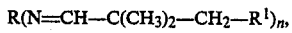

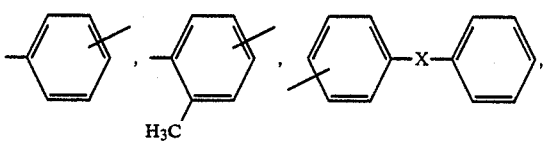

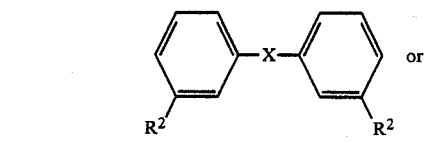

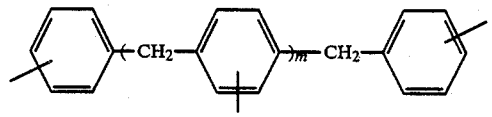

x is a —CH$_2$—, —C(CH$_3$)$_2$—, —O—, —SO—, —SO$_2$— OR —CO— bridge member;

R$^2$ is a linear or branched alkyl radical having from 1 to 4 carbon atoms;

m is a whole number from 1 to 4;

R¹ is a hydrogen atom, an alkyl group having from 1 to 10 carbon atoms, an alkoxy group having from 1 to 20 carbon atoms, or an alkoyloxy group having from 1 to 20 carbon atoms; and n is a whole number from 2 to 6; and optionally including (C) an aromatic and/or aliphatic carboxylic acid or toluenesulfonic acid; and optionally further including;

(D) auxiliary agents and/or additives.

2. A moisture tempered, storage stable single component polyurethane system according to claim 1 wherein the polyurethane prepolymers are prepared by reaction of di- and/or trifunctional polyester and/or polyether-polyols having molecular weights from 1000 to 8000 and an aromatic polyisocyanate.

3. A moisture tempered, storage stable single component polyurethane system according to claim 2 wherein 4,4'-diphenylmethane diisocyanate or a mixture of at least 50 percent by weight 4,4'-diphenylmethane diisocyanate, from 0 to 50 percent by weight 2,4'-diphenylmethane diisocyanate and/or from 0 to 30 percent by weight polyphenyl-polymethylene polyisocyanate are used as the aromatic polyisocyanate, so that the total of the components results in 100 percent by weight.

4. A moisture tempered, storage stable single component polyurethane system according to claim 1 containing from 0.4 to 1.3 equivalents of $-N=CH$ groups of polyaldimines (B) per NCO groups of polyurethane prepolymers (A).

5. A moisture tempered, storage stable single component polyurethane system according to claim 1 containing from 0 to 100 equivalents of a carboxylic acid or toluenesulfonic acid per polyaldimine (B).

6. A moisture tempered, storage stable single component polyurethane system according to claim 1 containing from 0.2 to 10 percent by weight malonic acid diethyl ester, based on the weight of the polyurethane prepolymer (A).

7. A polyurethane elastomer or coating prepared from a single component polyurethane system according to claim 1.

* * * * *